Figure 1:
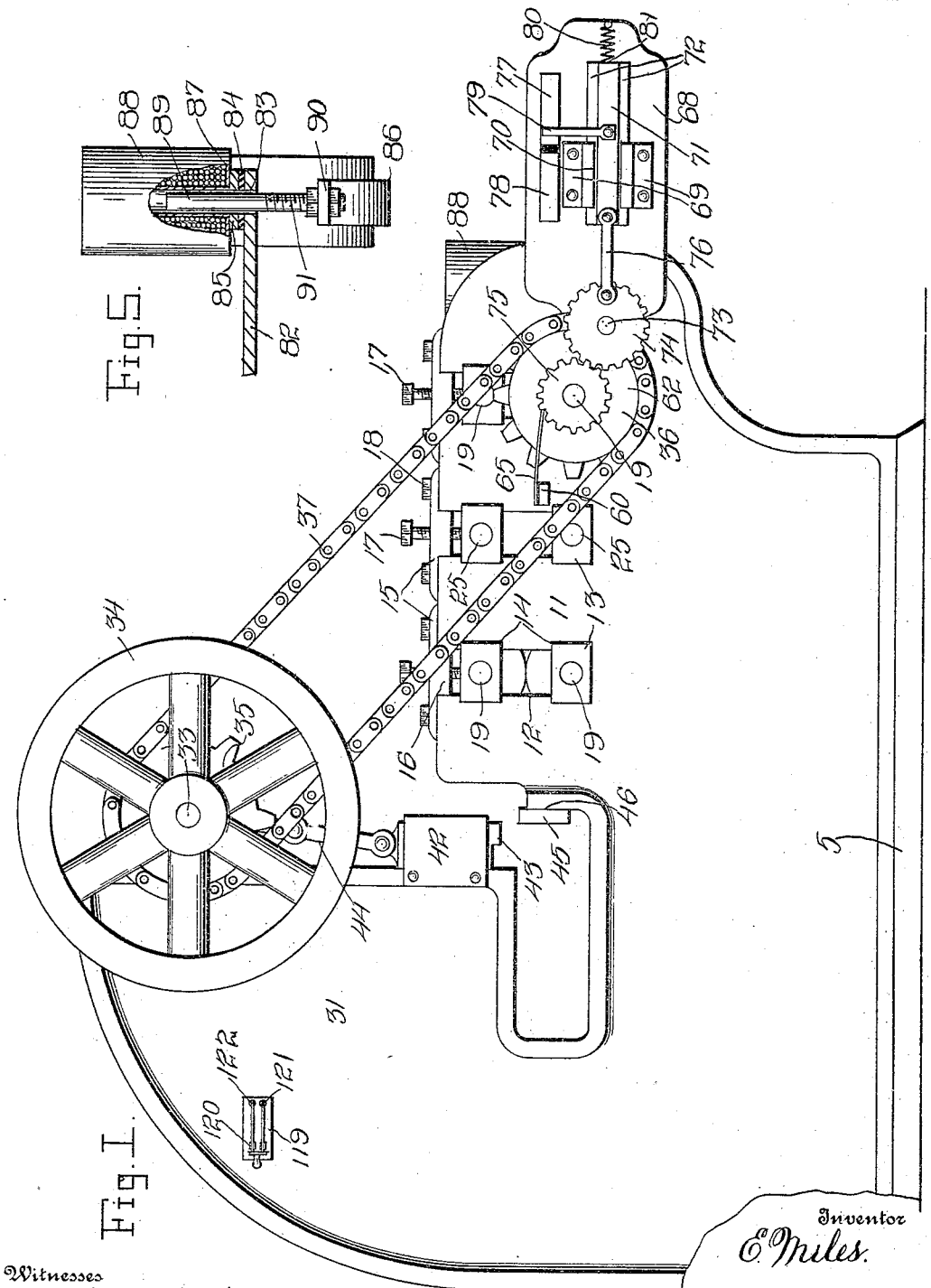

E. MILES.
ELECTRICALLY CONTROLLED SQUARING MECHANISM FOR SHEARING MACHINES.
APPLICATION FILED AUG. 16, 1906. RENEWED JUNE 11, 1909.

946,457.

Patented Jan. 11, 1910.

5 SHEETS—SHEET 1.

E. MILES.
ELECTRICALLY CONTROLLED SQUARING MECHANISM FOR SHEARING MACHINES.
APPLICATION FILED AUG. 16, 1906. RENEWED JUNE 11, 1909.

946,457.

Patented Jan. 11, 1910.
5 SHEETS—SHEET 3.

Witnesses:
C. K. Reichenbach.
V. G. Smith

Inventor
E. Miles.
By
[signature]
Attorneys.

E. MILES.
ELECTRICALLY CONTROLLED SQUARING MECHANISM FOR SHEARING MACHINES.
APPLICATION FILED AUG. 16, 1906. RENEWED JUNE 11, 1909.
946,457.
Patented Jan. 11, 1910.
5 SHEETS—SHEET 4.
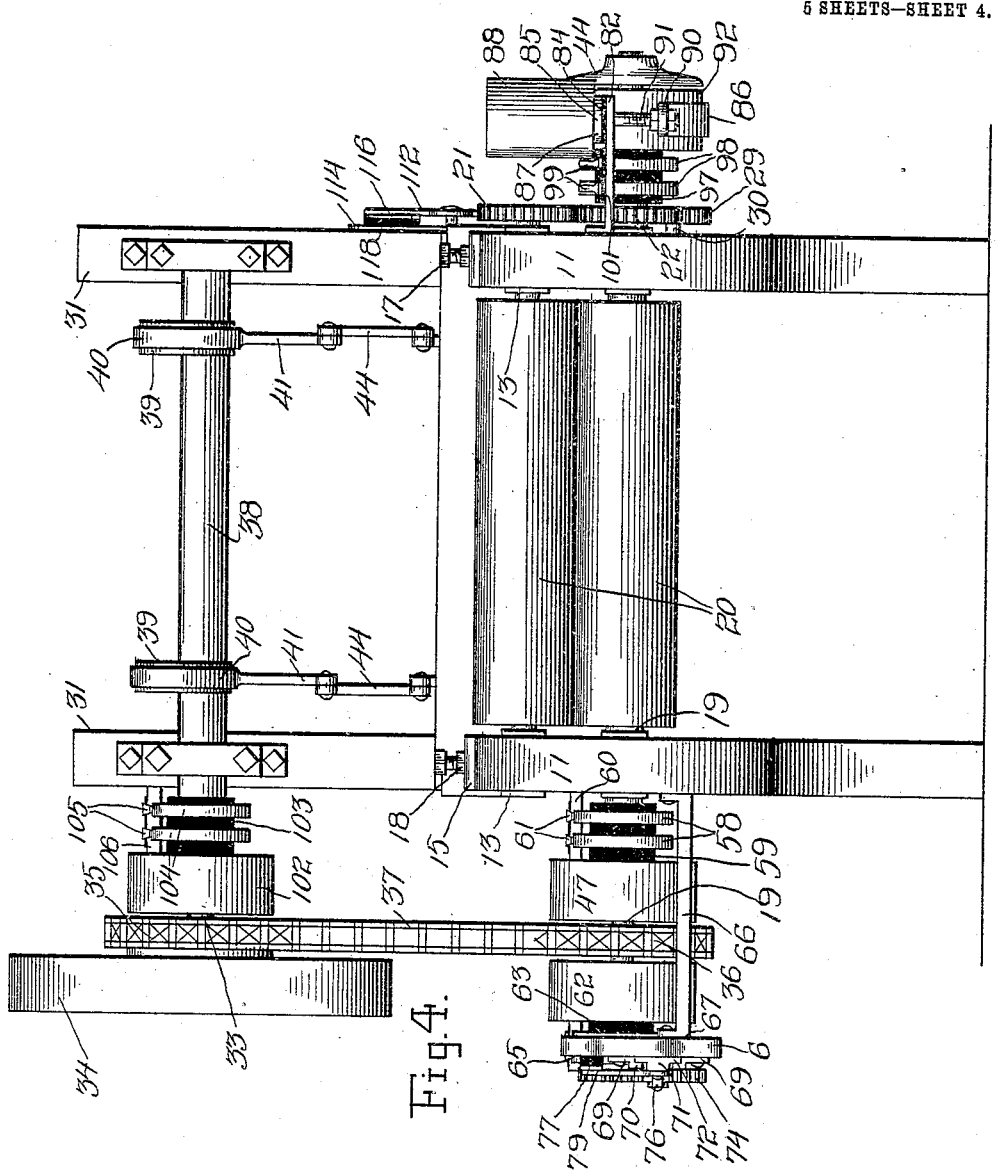

E. MILES.
ELECTRICALLY CONTROLLED SQUARING MECHANISM FOR SHEARING MACHINES.
APPLICATION FILED AUG. 16, 1906. RENEWED JUNE 11, 1909.
946,457.
Patented Jan. 11, 1910.
5 SHEETS—SHEET 5.
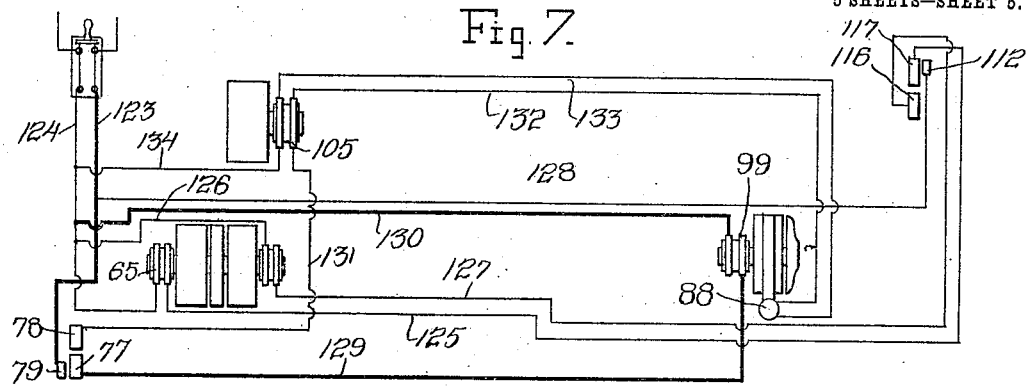
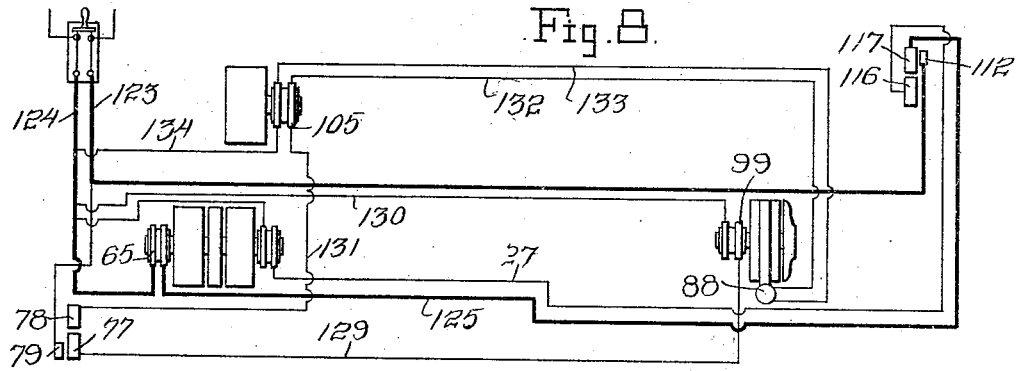
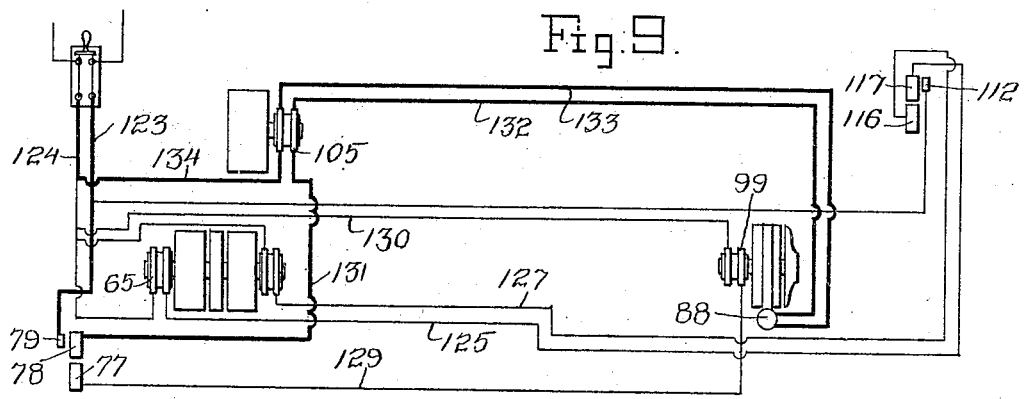

UNITED STATES PATENT OFFICE.

EDMUND MILES, OF HARRISBURG, PENNSYLVANIA, ASSIGNOR OF ONE-THIRD TO CHARLES FRANKLIN McCANN AND ONE-THIRD TO WESLEY JAMES DICE, OF HARRISBURG, PENNSYLVANIA.

ELECTRICALLY-CONTROLLED SQUARING MECHANISM FOR SHEARING-MACHINES.

946,457.  Specification of Letters Patent.  Patented Jan. 11, 1910.

Application filed August 16, 1906, Serial No. 330,872. Renewed June 11, 1909. Serial No. 501,654.

*To all whom it may concern:*

Be it known that I, EDMUND MILES, subject of Great Britain, residing at Harrisburg, in the county of Dauphin, State of Pennsylvania, have invented certain new and useful Improvements in Electrically-Controlled Squaring Mechanism for Shearing-Machines; and I do hereby declare the following to be a full, clear, and exact description of the invention, such as will enable others skilled in the art to which it appertains to make and use the same.

This invention relates to shearing machines and more particularly to a squaring mechanism therefor, the primary object of the invention being to provide an electrically controlled squaring mechanism which will be automatic in its operation and by means of which a sheet of metal may be cut into pieces of any desired size without the necessity of setting the machine after each cut. In the present machines of this character, the shearing blade is set in motion by means of a foot-lever and the plate being cut, must be manually set against the proper gages to insure proper shearing of the same. Furthermore, in the machines now in use, it is necessary to cut each of the four edges of the sheet separately, while in my machine, the four edges are cut in practically one operation, and this entirely automatic and without manual labor on the part of the operator of the machine.

The invention resides broadly in the provision of a system of magnetic clutches by means of which the feed rollers of the machine, the shearing knife thereof, and a brake element are controlled, the brake element being disposed upon one of the feed roller shafts and being arranged to stop the rotation of the shaft when the sheet has been fed to the proper point beneath the shearing knife, the brake element being thrown into circuit simultaneously with the shearing blade.

A further object of the invention resides in the provision of novel means for regulating the length of the piece to be cut from the sheet.

Figure 2:
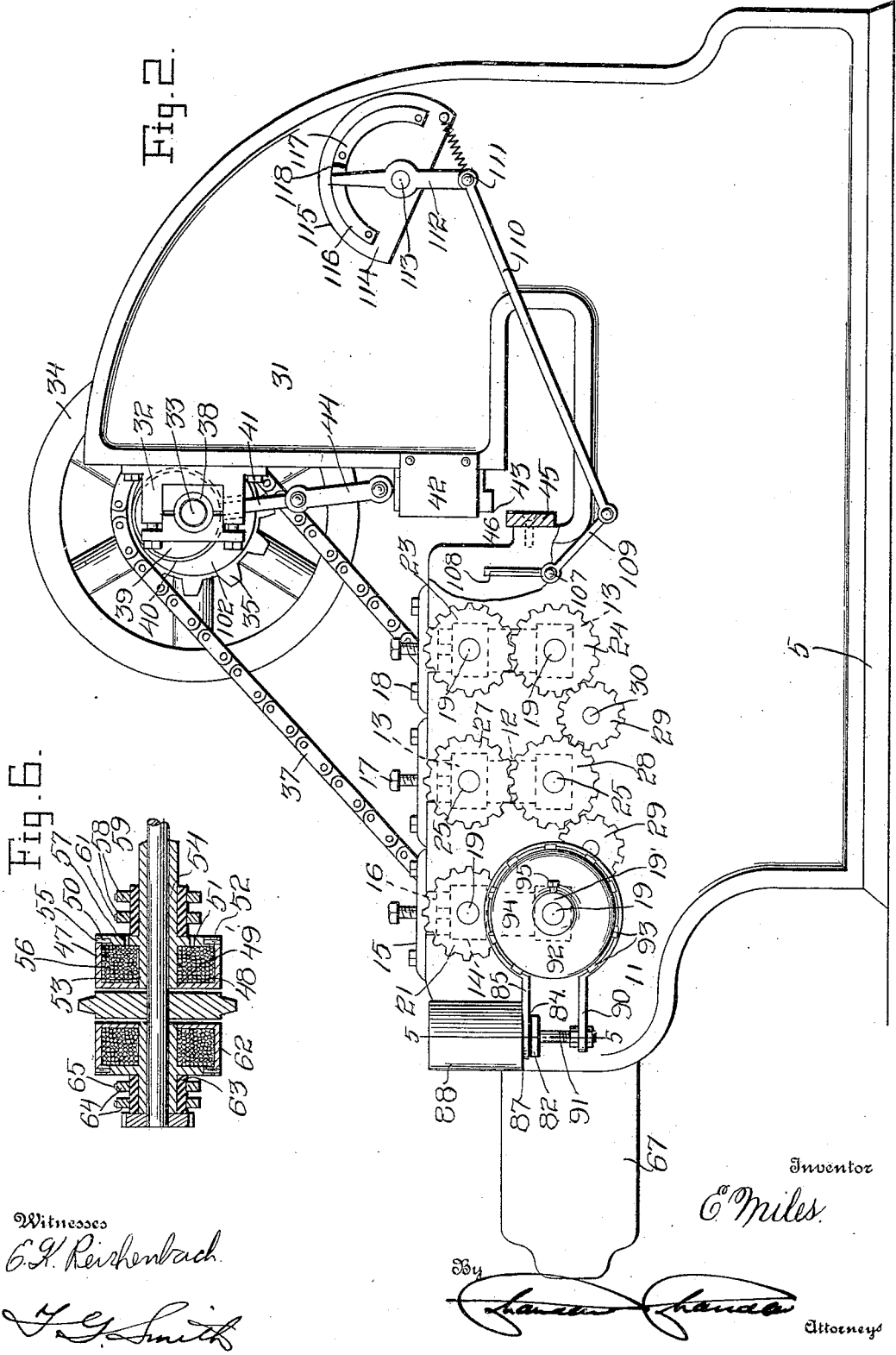
Figure 3:
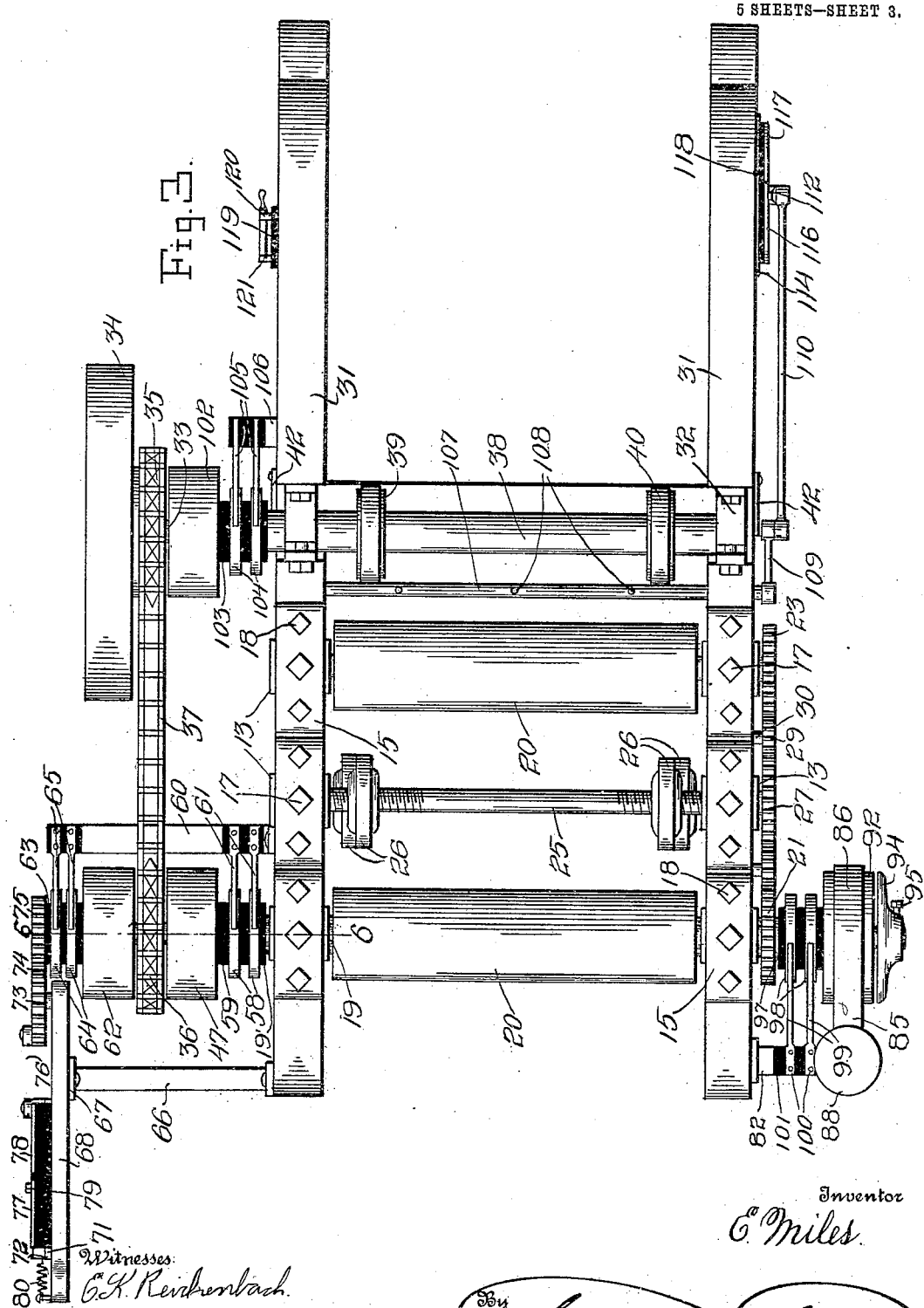

With the above and other objects in view, the present invention consists in the construction and arrangement of parts, shown in the accompanying drawings, in which:

Figure 1 is a side elevation of one side of the machine, Fig. 2 is a similar view of the opposite side thereof, Fig. 3 is a top plan view of the machine, Fig. 4 is a front elevation of the same, Fig. 5 is a detail view partly in section of the brake for the feed mechanism, Fig. 6 is a detail sectional view on the line 6—6 of Fig. 3, Fig. 7 is a diagrammatic view showing in heavy lines the circuit when the feed rollers are in operation, Fig. 8 is a similar view showing the circuit when the rollers are out of operation and the clutch for withdrawing the armature from the roller clutch is in circuit, and, Fig. 9 is a similar view showing the circuit when the solenoid for the brake and the clutch upon the shearing knife shaft are in circuit.

Referring more specifically to the drawings, the shearing machine comprises a suitable base 5 from the sides of which extend upwardly spaced uprights 11. Each of the uprights is provided at corresponding points in its upper edge with recesses 12 for the reception of journal-boxes 13, it being understood that the said recesses extend vertically, there being a pair of such journal-boxes disposed in each recess, the boxes being each provided at its ends with flanges 14 which prevent accidental disengagement of the box from its respective recess. In order to prevent vertical movement of the boxes from their recesses, cap-plates 15 are disposed upon the upper edges of the uprights 11 above the recesses therein and are each provided upon their under faces with block extensions 16 which fit snugly in the walls of their respective recesses and through which are engaged adjusting screws 17 which are arranged to bear with their lower ends against the upper journal boxes 16 as clearly shown in Fig. 2 of the drawings for a purpose to be hereinafter described, it being understood that the said cap plates are removably secured in position upon their respective uprights, preferably by means of screw-bolts 18. In the drawings, I have shown three pairs of such journal-boxes and journaled in the corresponding upper and lower boxes of each of the end pairs of the same, are the ends of shafts 19 upon which are secured feed-rollers 20, the said rollers of each pair being inter-geared by means of pinions 21 and 22 which connect the forward pair of rollers, and pinions 23 and 24 which connect the rear pair. The lower one of the forward pair of rollers is mounted upon a sleeve shaft 19' which rotates upon the corresponding shaft 19. Journaled at their ends in the intermediate pairs of journal boxes are threaded shafts 25 upon which are adjustably mounted shearing disks 26 which serve to cut or shear the sides of a sheet being acted upon by the machine. The shafts 25 are provided at their ends corresponding to the ends upon which the pinions for the feed roller shafts are located with mutually meshing pinions 27 and 28 carried by the upper and lower shafts respectively. The pinion 28 is intergeared with the pinions 22 and 24 by means of idler pinions 29 which are journaled upon stub shafts 30 in position to mesh with the said feed-roll pinions.

At their rear ends, each of the uprights 11 is provided with an upwardly and forwardly directed extension 31 and journaled in suitable bearing boxes 32 mounted upon the forward edge of each of the extensions 31 is a shaft 33, which has one of its ends extended considerably beyond the side of the adjacent extended portions and upon this end is mounted a pulley 34 to which is secured, in any suitable manner, a sprocket-gear 35. The shaft 22 is provided outwardly of one of the uprights with a sprocket-gear 36 which is fixed upon the shaft for rotation therewith and connecting the sprocket-gears 35 and 36 is a sprocket-chain 37, it being understood that the shaft 33 is driven through the instrumentality of a belt, engaged with the pulley 34, from a power-shaft (not shown).

Disposed upon the shaft 33 is a sleeve-shaft 38 the said shaft 33 being arranged for rotation at times independently of said sleeve-shaft 38. Secured upon the sleeve-shaft 38 are eccentrics 39 around which are engaged the usual eccentric straps 40, which latter include each an arm 41. Mounted at its ends in suitable guide brackets 42 is a shearing blade 43 which is connected at its upper edge with the arms 41, by means of links 44, it being understood that when the said sleeve-shaft is rotated, under conditions to be hereinafter fully described, the eccentric straps and their respective arms will be oscillated in the usual manner, resulting in a vertical reciprocatory movement of the shearing blade 43. The said blade coöperates with a second shearing blade 45 which is bolted or otherwise secured as at 46, at its ends, to the uprights 11 and extends from one to the other of the said uprights and in position for shearing contact with the blade 43. It will be seen from the foregoing that one of the feed-rollers is mounted for turning movement upon one of the driven shafts of the machine and that consequently when there is no connection between the said roller, or rather its sleeve shaft, and the driven-shaft which has been indicated by the numeral 22, the rollers will remain idle as will also the shafts 25. It will also be understood that the sleeve-shaft 38 normally remains idle and consequently the shearing blade 43 also remains normally idle. In order however that the feed roller and the shearing blade may be operated successively to cut a sheet of metal into smaller sheets of a predetermined size, I provide a novel system of electro-magnetic clutches which will now be described.

Mounted upon the sleeve-shaft 19 for rotation therewith is an electro-magnetic clutch which comprises a drum 47 open at one end and provided at its other end with a head 48 through which is formed a central opening 49 for the engagement of the sleeve shaft 19 therethrough. The drum is provided upon its inner periphery and at its open end with screw-threads 50 and the said drum is arranged for connection with a core comprising an annular plate 51 which has its periphery screw-threaded as at 52 to permit of such connection and from opposite sides of which plate project sleeves 53 and 54, the drum-head 48 being arranged to abut the end of the sleeve 53. The drum 47 is held against accidental disconnection from its core by means of screws 55 which are engaged through the threaded portion of the drum and in threaded bores in the periphery of the annular plate 51. It will be noted that in this manner a casing is formed in which is located the usual armature winding 56, the terminals of the wires of the armature winding being extended through openings 57 formed in the annular plate 51 and are connected to collars 58 which are mounted upon a sleeve 59 of fibrous material which in turn, is disposed upon the sleeve 54 of the core. An arm 60 is secured at one of its ends to the upright adjacent the above named elements and to the arms are secured the inner ends of brushes 61 which have their outer ends bearing one against each of the contact collars 58. The sprocket gear 36 is constructed in such a manner that it will also serve as an armature for the clutch just described and it will of course be understood that the armature winding is energized, the armature is clutched with the electro-magnetic clutch proper thereby resulting in a rotation of the clutch with the armature and consequently a rotation of the feed rollers of the machine.

Mounted upon the shaft 22 upon the opposite side of the sprocket gear and armature 36, to the clutch 47, is a clutch 62 which is of precisely the same construction as the clutch 47 and hence need not be specifically described except to state that the sleeve corresponding to the sleeve 54 of the clutch 47 is provided with a collar 63 of fibrous material upon which is engaged a pair of contact collars 64 against which rest the ends of brushes 65 which are secured to the arm 60 adjacent its outer end.

While in theory, the combined armature and sprocket-gear 36 would be released from the clutch 47 as soon as the clutch was cut out of circuit, there will be sufficient residual magnetism to hold the armature and sprocket-gear to the clutch after breaking of the circuit. In order to avoid this undesired result, I have provided the clutch 62, above described, and which has as its function to clutch the armature, after such breaking of the circuit and thereby entirely release the rollers from their driving elements.

A novel form of make and break mechanism is provided for cutting the clutches into and out of circuit and the said mechanism will now be described, although the arrangement and connection of the conductor wires between this mechanism and others to be presently described will be disregarded for a time.

The mechanism above referred to comprises a bracket arm 66 which is secured at one of its ends to the outer face of the upright to which the bracket-arm 60 is secured and to the outer end of which is bolted or otherwise secured as at 67, a plate 68 which is formed of fibrous or other insulating material. The plate extends forwardly of the machine and upon the outer face of the plate are secured bearing brackets 69 which include each an attaching portion and an upwardly and laterally directed flange 70, the flanges of the bearing brackets being directed toward each other and being designed to receive between them a block 71 preferably of fibrous material, the said block being provided upon each side with a flange 72 which is engaged between the flange of the adjacent bracket and the said plate 68, the said block being thus held slidably upon the plate 68. In order that the block may be reciprocated for a purpose to be presently described, I provide upon the plate a stub-shaft 73 upon which is mounted a pinion 74 which meshes with a pinion 75 on the shaft 22 and connect the pinion 74 with the lock 71 by means of a link 76. Mounted upon the outer face of the plate 68 in spaced relation to each other, are contact plates 77, 78 and secured at one of its ends to the block 71 is a contact arm 79 which is designed to contact successively with the contact plates 77 and 78 upon reciprocation of the block 71. In order that the block 71 may be moved forwardly after being moved rearwardly through the instrumentality of the pinion 74 and arm 76, I provide a helical spring 80 which is connected at one of its ends to the plate 68 and at the other of its ends as at 81 to the end of the block 71 opposite the end to which the arm 76 is connected.

The invention also resides in the provision of means for stopping the rotation of the feed roller when the sheet to be cut has been fed a sufficient distance into the machine and this means comprises an arm 82 which is secured at one of its ends to the outer face of the other of the uprights 11 and which is provided adjacent its outer end with an opening 83 for a purpose to be presently described. Bolted or otherwise secured upon the arms and held in spaced relation thereto by means of a strip of insulating material 84 is one arm 85 of a friction brake, the said brake being in the form of a substantially annular body 86 which is formed from a strip of metal bent into the form stated and having its end portions bent to extend in parallel relation and outwardly from the annular body portion of the brake, as clearly shown in Fig. 2. The arm 85 above noted has its outer end enlarged and flattened as at 87, the enlarged flattened portion being located in a horizontal plane and upon the said flattened portion is located a solenoid 88 of the ordinary construction and including the usual armature 89. Secured to the other arm of the brake which is indicated by the numeral 90 is the lower end of a rod 91 which projects into the solenoid. The annular body portion of the brake element encircles an electro-magnetic clutch 92 which is identical in construction with the clutches 47 and 62 heretofore described and which is mounted upon the sleeve-shaft 19 for rotation therewith and it will be readily understood that when the solenoid is energized, the rod 91 will be drawn thereinto, thereby decreasing the size of the annular body portion of the brake element and causing it to grip the periphery of the electro-magnetic clutch, a frictional braking contact being had between these two elements by means of blocks 93 of wood or the like which are seated in suitable recesses formed in the inner periphery of the annular body portion of the brake element. The armature for the electro-magnetic clutch 92 consists of an annular collar 94 which is secured upon the shaft 22 for rotation therewith by means of a set-screw 95 engaged through an extension on the said collar and impinging against the said shaft. This clutch 92, as in the case of the clutches 47 and 62 has one of the sleeve portions of its core located outwardly of the drum and provided with a sleeve 97 of fibrous or other insulating material and upon the sleeve is located a pair of contact collars 98 against which rest the free ends of brushes 99 which are secured as at 100 to the arm 84 and are held in spaced relation thereto by means of a strip of insulating material 101.

Mounted upon the sleeve-shaft 38 and outwardly of the upright 11 adjacent the pulley 34 is an electro-magnetic clutch 102 which has for its armature, the sprocket-gear 35 and upon the sleeve portion of the core of which, which lies outwardly of the drum, is disposed an insulating sleeve 103 of any suitable material. Disposed upon the said sleeve is a pair of contact collars 104, there being brushes 105 arranged upon an arm 106, which is secured to the adjacent upright 11, and contacting with the said contact collars 104.

Suitable mechanism is also provided for cutting the last named electro-magnetic clutch into and out of circuit to control the movement of the shearing blade, and this mechanism comprises a rock-shaft 107 which is journaled in the uprights 11 of the machine and slightly in advance of the shearing blade 45 and in a plane below the upper edge thereof and which is provided at intervals throughout its length with a series of fingers 108, which, when the shaft is in its normal position, extends upwardly in a common vertical plane, the said fingers being designed for the engagement therewith of the sheet being cut, for a purpose to be presently described. The rock-shaft 107 is provided at one of its ends with a crank-arm 109 to which is connected one end of a connecting rod 110, the said rod being pivotally connected at its opposite end as at 111 with one end of a contact arm 112 which is pivoted intermediate its ends as at 113 to a plate 114 which is bolted or otherwise secured as at 115 to the adjacent upright 11. Secured upon the plate 114 in spaced relation thereto and in position for contact with the arm 112 at its end opposite to its connection with the connecting rod 110 are arcuate contact strips 116 and 117, the said strips being, as stated, held in spaced relation to the plate by means of insulating strips 118 which are interposed therebetween and the said plate.

The electro-magnetic clutches hereinbefore described and also their mechanisms for cutting the clutches into and out of circuit, are connected by a system of wiring which will now be fully explained.

Secured upon the outer face of one of the uprights 11 is a switch 119 including the usual binding post 120 for the wires leading from the source of supply of electricity and the binding posts 121 and 122 with which are connected wires 123 and 124. The wire 123 leads to the switch-arm 79 and is connected therewith preferably at its point of connection with the block 71 and the wire 124 leads from its respective contact post 122 to one of the brushes 65 for the electromagnetic clutch 62 and from the other brush of this clutch leads a wire 125 which is connected at its opposite end to the arcuate contact strip 117 upon the plate 114. Leading from the wire 124 to one of the brushes 61 for the clutch 47, is a branch wire 126 and leading from the other of the clutches for this clutch is a wire 127 which extends to and is connected with the arcuate contact plate 116. A branch wire 128 leads from the wire 123 to the pivoted contact arm 112. A wire 129 establishes connection between the contact plate 77 and one of the brushes 99 for the brake clutch 92 and extending from the other brush for the said clutch to the wire 124 and forming a junction therewith, is a wire 130. Leading from the contact plate 78 to one of the brushes 105 for the clutch upon the shearing blade shaft, is a wire 131 and leading from the said brush and connected with one pole of the solenoid 88 is a wire 132, and connected with the other pole of the solenoid at one of its ends and with the other brush for the clutch mentioned above, is a wire 133. A wire 134 also leads from this brush and forms a junction with the wire 124.

The operation of the machine is as follows: The sheet of material to be cut is inserted between the feed rollers at the forward end of the machine and is fed by the rollers toward the rear end thereof, it being understood that the switch 119 is closed and that the contact arm 112 is in contact with the arcuate contact strip 116, the circuit being made in this manner through the brushes for the feed-roller clutches. As stated in the foregoing, the shearing shaft 25 is operated simultaneously with the feed roller to trim the side edges of the sheet to form a plate of the required width, and it will be seen from the drawings that after being acted upon by the shearing disk knives upon this shaft, the sheet is engaged between the rear pair of rollers and guided into engagement with the fingers 108 upon the rock shaft 107. This engagement of the plate or sheet with the fingers, serves to rock the said shaft and consequently the contact arm 112 with which it is connected by means of the crank arm 109 and connecting rod 110. The contact arm 79, when the rollers start to rotate for the purpose of feeding the sheet into the machine, is in contact with the contact plate 78, but as will be readily understood, is moved into contact with the plate 77, by reason of the rotation of the rollers, as has been previously explained and it will be readily understood that the period of contact of the arm 79 with its contact plates 77 and 78 may be considerably lengthened or shortened by providing a larger or a smaller pinion 74 and that therefore the period of rotation of the feed rollers may be correspondingly varied to feed the sheet of material to a greater or less degree into the machine so that longer or shorter lengths may be cut therefrom. The circuit above described is shown in heavy lines in Fig. 8. As the contact arm 79 moves into contact with the plate 77, the contact arm 112 is moved upon its pivot as stated above and contacts with the arcuate contact strip 117, thus forming the circuit shown by heavy lines in Fig. 9 of the drawings in which circuit the clutch 62 is energized to clutch the armature and sprocket-gear 36 and withdraw the same from contact with the clutch 47 should it be held thereagainst by residual magnetism as stated in the foregoing. The plate, it will be understood, holds the rock shaft in position to maintain the contact between the arm 112 and the arcuate contact strip 117 by reason of its engagement with the fingers upon the said shaft, although the contact arm 79 is moved again into contact with the strip 78. The circuit thus formed includes the clutch upon the shearing knife shaft 38 and the solenoid 88, and it will be seen that simultaneously the brake band 86 is tightened and the shearing knife shaft set in operation, thereby stopping the plate at the proper point and causing the shearing knife to descend and cut the same to the proper length, after which the portion of the sheet which is cut, falls to the floor or into a suitable receptacle and the rock shaft is in this manner released, after which the operation above described is repeated.

It is to be understood that I do not desire to be limited to the exact details of construction shown and described, for obvious modifications will occur to those skilled in the art.

What is claimed is:

1. In a mechanism of the class described, the combination with a feed mechanism, a shearing mechanism for cutting a sheet into widths, a shearing mechanism for cutting the sheet into lengths, and a power shaft, of a source of electric supply, electro-magnetic clutches arranged to clutch respectively the power shaft and the feed mechanism, and, the power shaft and the length shearing mechanism, a switch for closing the circuit through the clutch for the power shaft and the feed mechanism, a rock shaft, fingers projecting from the rock shaft in the path of the plate being fed by the feed mechanism, whereby when the said plate has been fed to a predetermined degree, the shaft will be rocked, connection between the rock shaft and the said switch whereby when the shaft is rocked, the switch will be operated to release the clutch, an electrically controlled brake for the feed mechanism, and a switch for closing the circuit simultaneously through the brake and the clutch for the length shearing mechanism.

2. In a mechanism of the class described, the combination with a feed mechanism, a shearing mechanism for cutting a sheet into widths, a shearing mechanism for cutting the sheet into lengths, and a power shaft, of a source of electric supply, electro-magnetic clutches arranged to clutch respectively the power shaft and the feed mechanism, and, the power shaft and the length shearing mechanism, a switch for closing the circuit through the clutch for the power shaft and the feed mechanism, a rock shaft, fingers projecting from the rock shaft in the path of the plate being fed by the feed mechanism, whereby when the said plate has been fed to a predetermined degree, the shaft will be rocked, connection between the rock shaft and the said switch whereby when the shaft is rocked, the switch will be operated to release the clutch, an electrically controlled brake for the feed mechanism, and a switch for closing the circuit simultaneously through the brake and the clutch for the length shearing mechanism, said switch being operable from the feed mechanism.

3. In a mechanism of the class described, the combination with a feed mechanism, a shearing mechanism for cutting a sheet into widths, said shearing mechanism being driven from the feed mechanism, a shearing mechanism for cutting the sheet into lengths, and a power shaft, of a source of electric supply, electro-magnetic clutches arranged to clutch respectively the power shaft and the feed mechanism, and the power shaft and the length shearing mechanism, an oscillatory switch arm movable to close the circuit through the clutch for the power shaft and the feed mechanism or to open the said circuit, a rock shaft, fingers projecting from the rock shaft in the path of the plate being fed by the feed mechanism whereby when the said plate has been fed to a predetermined degree the shaft will be rocked, connection between the rock shaft and the said switch arm whereby when the shaft is rocked, the switch arm will be operated to release the clutch, an electrically controlled brake for the feed mechanism, and a switch operable from the feed mechanism and designed to close the circuit through the brake and the clutch for the length shearing mechanism.

In testimony whereof, I affix my signature, in presence of two witnesses.

EDMUND MILES.

Witnesses:
HARRY M. BRETZ,
CHARLES E. BRETZ.